(12) United States Patent
Kambe et al.

(10) Patent No.: US 9,641,976 B2
(45) Date of Patent: May 2, 2017

(54) ITEM MANAGEMENT SYSTEM

(71) Applicant: TOSHIBA TEC KABUSHIKI KAISHA, Tokyo (JP)

(72) Inventors: Yukihiko Kambe, Mishima Shizuoka (JP); Shinichi Kashiwagi, Susono Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 91 days.

(21) Appl. No.: 14/800,259

(22) Filed: Jul. 15, 2015

(65) Prior Publication Data
US 2016/0029168 A1    Jan. 28, 2016

(30) Foreign Application Priority Data

Jul. 25, 2014   (JP) .................................. 2014-151996

(51) Int. Cl.
| | | |
|---|---|---|
| G06K 7/10 | (2006.01) | |
| H04W 4/02 | (2009.01) | |
| G06Q 10/08 | (2012.01) | |

(52) U.S. Cl.
CPC .......... *H04W 4/023* (2013.01); *G06Q 10/087* (2013.01); *G06Q 10/0836* (2013.01)

(58) Field of Classification Search
CPC .. H04W 4/023; G06Q 10/087; G06Q 10/0836
See application file for complete search history.

(56) References Cited

U.S. PATENT DOCUMENTS

| | | | | |
|---|---|---|---|---|
| 2007/0229272 | A1* | 10/2007 | Cash ...................... | G06Q 10/08 340/572.1 |
| 2009/0243797 | A1* | 10/2009 | Leung ................. | G07F 17/0092 340/5.73 |
| 2011/0156907 | A1* | 6/2011 | Nagai .................. | G06K 7/0008 340/572.1 |

FOREIGN PATENT DOCUMENTS

JP         2008-152686         7/2008

\* cited by examiner

*Primary Examiner* — Nabil Syed
(74) *Attorney, Agent, or Firm* — Patterson & Sheridan, LLP

(57) ABSTRACT

An item management apparatus includes a reader that reads a first identification of a first radio device carried by a user and a second identification of an alarm device correlated with an item deposited by the user. A memory stores the first identification and the second identification read by the reader in association with each other. A receiver receives a first signal from the first radio device. A processor determines a distance to the first radio device based on the first signal. A transmitter transmits a second signal for causing the alarm device to provide an alarm notice if the distance to the first radio device is determined to be equal to or less than a predetermined distance.

20 Claims, 12 Drawing Sheets

FIG. 2

| RADIO WAVE STRENGTH (db) | DISTANCE (m) |
|---|---|
| A1 | B1 |
| A2 | B2 |
| A3 | B3 |
| A4 | B4 |
| A5 | B5 |
| ⋮ | ⋮ |

| RADIO DEVICE ID | ALARM DEVICE ID | DEPOSIT DATE AND TIME |
|---|---|---|
| C099 | D156 | YYYYMMDDhhmm |
| C123 | D058 | YYYYMMDDhhmm |
| C025 | D333 | YYYYMMDDhhmm |
| C087 | D027 | YYYYMMDDhhmm |
| C001 | D014 | YYYYMMDDhhmm |
| ⋮ | ⋮ | ⋮ |

| RADIO DEVICE ID | RADIO WAVE STRENGTH Am | DISTANCE Dn | DISPLAY F1 | ALARM F2 |
|---|---|---|---|---|
|  |  |  |  |  |
|  |  |  |  |  |
|  |  |  |  |  |
|  |  |  |  |  |

400

ITEM MANAGEMENT SYSTEM

CROSS-REFERENCE TO RELATED APPLICATION

This application is based upon and claims the benefit of priority from Japanese Patent Application No. 2014-151996, filed Jul. 25, 2014, the entire contents of which are incorporated herein by reference.

FIELD

Embodiments described herein relate generally to an item management system that is established in a baggage office where an item is temporarily kept for a user.

BACKGROUND

In a baggage office of the related art, when a user comes to a counter, a person in charge of the counter searches for an item which was deposited by the user. For this reason, it takes time to deliver the item to the user, and thus, there is a need for shorter delivery time.

DESCRIPTION OF THE DRAWINGS

FIG. 2 illustrates an example conversion table.

FIG. 3 illustrates an example baggage management file.

FIG. 4 illustrates an example track file.

DETAILED DESCRIPTION

Embodiments provide an item management system capable of achieving an efficient counter service by reducing time required to deliver an item.

According to one embodiment, an item management apparatus includes a reader that reads a first identification of a first radio device carried by a user and a second identification of an alarm device correlated with an item deposited by the user. A memory stores the first identification and the second identification read by the reader in association with each other. A receiver receives a first signal from the first radio device. A processor determines a distance to the first radio device based on the first signal. A transmitter transmits a second signal for causing the alarm device to provide an alarm notice if the distance to the first radio device is determined to be equal to or less than a predetermined distance.

Hereinafter, embodiments of an item management system capable of achieving an efficient counter service by reducing time required to deliver an item will be described with reference to the drawings.

First Embodiment

Figure 1:
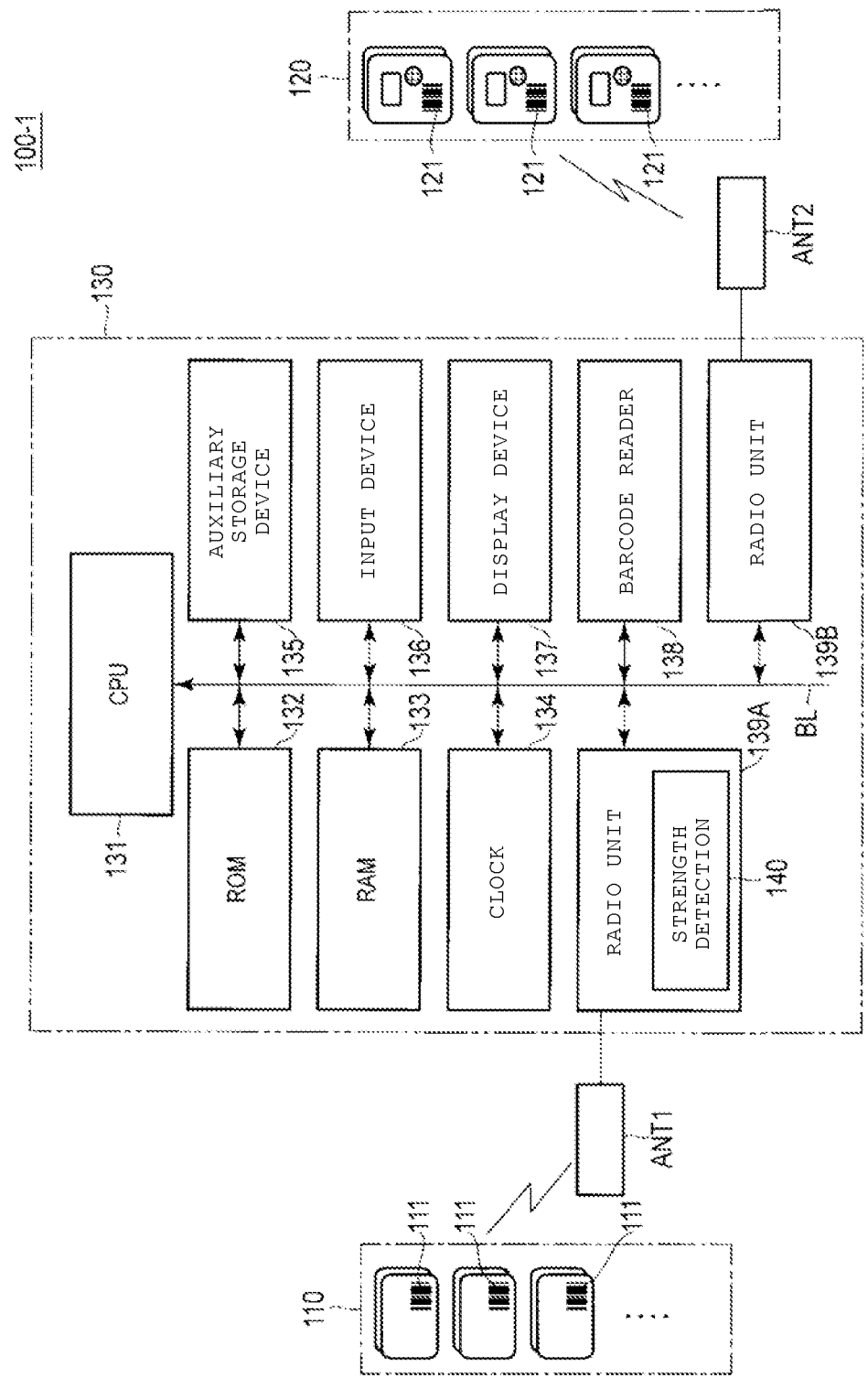
FIG. 1 is a schematic diagram showing an example configuration of an item management system according to a first embodiment.

FIG. 1 is a schematic diagram showing an example configuration of a baggage management system 100-1 (item management system) according to a first embodiment. The baggage management system 100-1 includes a plurality of radio devices 110, a plurality of alarm devices 120, and a baggage management device 130.

The radio device 110 transmits (periodically or continuously) a beacon signal by using a wireless personal area network (PAN) represented by, for example, Bluetooth (registered trademark) or ZigBee (registered trademark), or a wireless local area network (LAN). A unique ID (hereinafter, referred to as a radio device ID) of the radio device 110 is included in the beacon signal. The radio device 110 may be a transmitter that transmits only the beacon signal. Each of the plurality of radio devices 110 is stored at a counter of a baggage office, and is manually passed to a user who deposits a bag (item). The user carries the radio devices 110 while the bag is stored, and returns the radio device 110 in exchange for the bag when picking up the deposited bag. Here, the radio device 110 functions as a first radio device carried by the user. A barcode 111 is assigned to the radio device 110 representing the radio device ID of the radio device.

When receiving an alarm signal corresponding to the unique ID (hereinafter, referred to as an alarm device ID) assigned to the alarm device 120, the alarm device 120 provides an alarm alert. The alarm signal is transmitted from the baggage management device 130. The alarm alert may be performed through both of light emission from a light source and sound production from a sound source. The alarm alert may be initially performed through only the light emission, and may be additionally performed through the sound production after a predetermined time elapses. The alarm alert may be initially performed through only the sound production, and may be additionally performed through the light emission after a predetermined time elapses. For example, the alarm alert may be stopped by turning off a manual switch. After the alarm alert is stopped, the alarm alert is not provided unless another alarm signal is sent. Each of the plurality of alarm devices 120 is stored in the counter of the baggage office. One of the alarm devices 120 is attached to the bag deposited by the user. When the user deposits a plurality of bags, the plurality of bags may be gathered in one place, and the alarm device 120 may be attached to one bag of the plurality of bags. The alarm device 120 may not be attached to the bag, and may be placed in a place where the bag is present. A barcode 121 representing the alarm device ID of the alarm device is assigned to the alarm device 120.

The baggage management device 130 includes a central processing unit (CPU) 131, a read-only memory (ROM) 132, a random-access memory (RAM) 133, a clock 134, an auxiliary storage device 135, an input device 136, a display device 137, a barcode reader 138, a first radio unit 139A, and a second radio unit 139B. The baggage management device 130 connects the central processing unit (CPU) 131 to the read-only memory (ROM) 132, the random-access memory (RAM) 133, the clock 134, the auxiliary storage device 135, the input device 136, the display device 137, the barcode reader 138, and the first and second radio units 139A and 139B through a bus line BL such as an address bus or a data bus.

The CPU 131 corresponds to a core part of a computer. The CPU 131 controls the respective units for realizing various functions as the baggage management device 130 according to an operating system or an application program.

The ROM 132 corresponds to a storage part of the computer. The ROM 132 stores the operating system and the application program. The ROM 132 stores data required to perform processes for controlling the respective units by the CPU 131 in some cases.

The RAM 133 corresponds to another storage part of the computer. The RAM 133 stores data required to perform process by the CPU 131. The RAM 133 is also used as a work area where information is appropriately rewritten by the CPU 131. The clock 134 measures a system time (date and time) of the computer.

The auxiliary storage device 135 corresponds to an auxiliary storage part of the computer. The auxiliary storage device 135 is, for example, an electric erasable programmable read-only memory (EEPROM), a hard disc drive (HDD), or a solid state drive (SSD). The auxiliary storage device 135 stores data used to perform various processes by the CPU 131 or data generated by the process in the CPU 131. The auxiliary storage device 135 stores the application program in some cases.

The input device 136 receives an instruction input performed by an operator. The display device 137 displays various screens. For example, a keyboard or a mouse may be used as the input device 136. For example, a liquid crystal display may be used as the display device 137. The input device 136 and the display device 137 may be integrated using a touch panel.

The barcode reader 138 optically reads the barcodes 111 and 121 that are respectively provided on the radio device 110 and the alarm device 120.

The first radio unit 139A is connected to an antenna ANT1, and uses a radio wave propagation area of the antenna ANT1 as a wireless communication area. The radio unit 139A receives a beacon signal transmitted from the radio device 110 present within the wireless communication area. The antenna ANT1 is positioned near the counter of the baggage office. In case where the antenna ANT1 has directionality, it is possible to set a wide wireless communication area in a direction of the antenna ANT1 with the counter as a reference. In a case where the antenna ANT1 does not have directionality, it is possible to concentrically set the wireless communication area with the counter as its center. Here, the antenna ANT1 and the radio unit 139A function as a second radio device arranged near the baggage office. The radio unit 139A includes a strength detecting circuit 140. The strength detecting circuit 140 detects the strength (db) of a radio wave received by the antenna ANT1.

The second radio unit 139B is connected to an antenna ANT2, and uses a radio wave propagation area of the antenna ANT2 as a wireless communication area. The radio unit 139B transmits a start signal to the alarm device 120 present within the wireless communication area. For example, a leaky coaxial cable provided on the ceiling of a baggage office may be used as the antenna ANT in addition to a typical antenna.

The input device 136 and the barcode reader 138 are arranged in a place capable of being operated by a person in charge of the counter of the baggage office. The display device 137 is arranged in a place capable of being viewed by a person in charge of the counter or a person in charge of the baggage office.

The baggage management device 130 has three business modes including a keeping business mode, a tracking business mode and a notifying business mode. The baggage management device 130 may perform these three business modes in parallel.

The keeping business mode associates a user with a bag deposited by the user. The tracking business mode tracks a behavior of the user who deposits the bag. The notifying business mode notifies the person in charge of the counter that the user comes to pick up the bag. The respective business modes are respectively controlled by different application programs. In order to perform the respective business modes, the baggage management device 130 requires a conversion table 200 shown in FIG. 2, a baggage management file 300 shown in FIG. 3, and a track file 400 shown in FIG. 4.

The conversion table 200 is a data table for converting the radio wave strength (db) when the radio wave from the radio device 110 is received by the antenna ANT1 into a relative distance (m) between the radio device 110 and the antenna ANT1. The relative distance (m) for the radio wave strength (db) is experimentally calculated in advance, and the calculated data is set to the conversion table 200. The conversion table 200 is stored in the ROM 132 or the auxiliary storage device 135.

The baggage management file 300 is a data file that recodes a plurality of records with the radio device ID, the alarm device ID and deposit date and time as one recode. The baggage management file 300 is stored in the auxiliary storage device 135 or the RAM 133.

The track file 400 is a data file that records a plurality of records, with the radio device ID, a radio wave strength Am (db), a distance Dn (m), a display flag F1 and an alarm flag F2 as one record. The track file 400 is stored in the auxiliary storage device 135 or the RAM 133. The alarm device ID associated with the radio device ID may also be included in each record of the track file 400.

Figure 5:
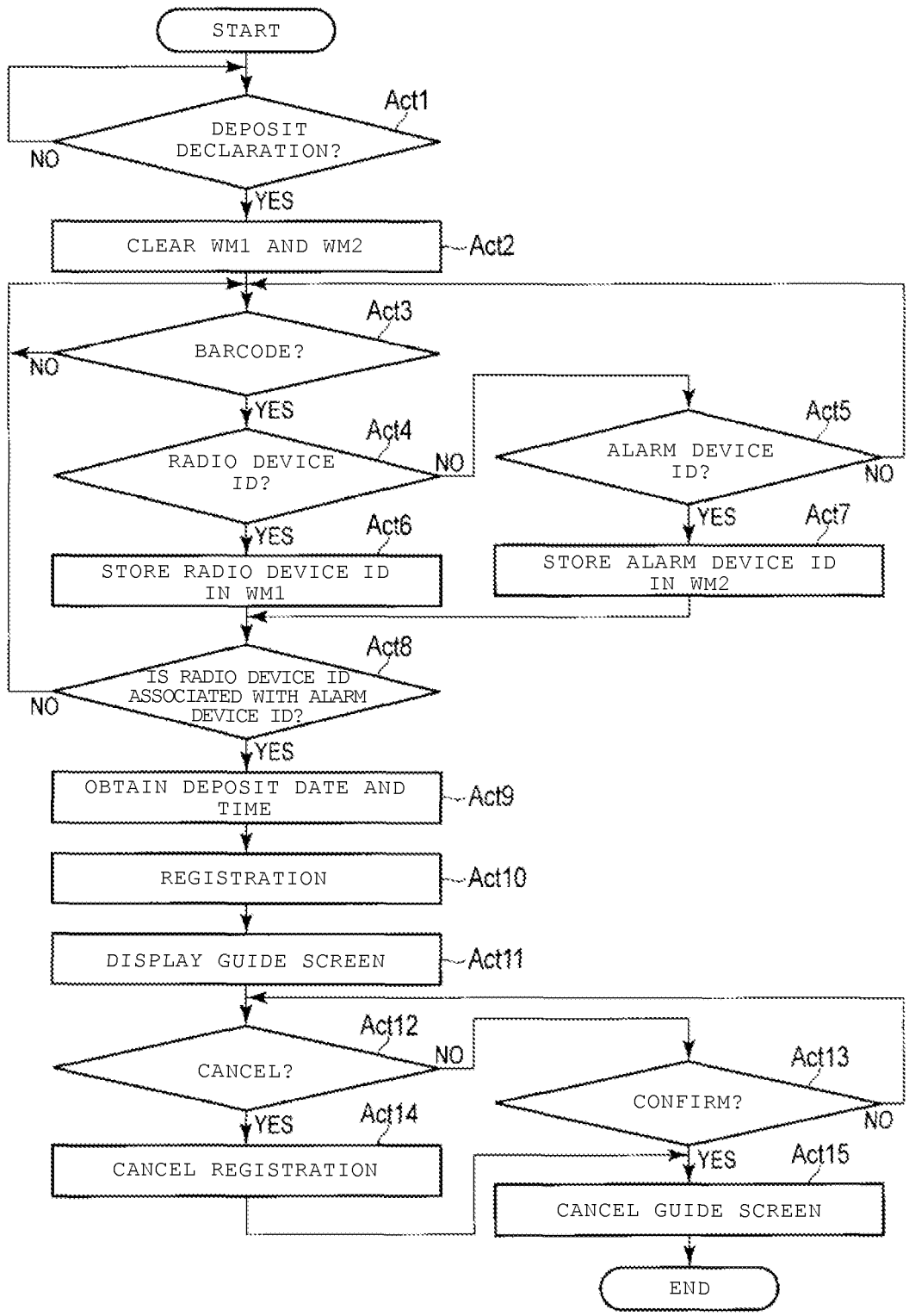
FIG. 5 is a flowchart illustrating an example processing procedure of a keeping business.

Hereinafter, the respective business modes will be described in sequence. First, the keeping business mode will be described with reference to the flowchart of FIG. 5.

When the baggage management device 130 is booted up, an application program that controls the keeping business starts. When the program starts, the CPU 131 starts the process of FIG. 5. First, the CPU 131 waits for deposit declaration (Act 1). When the input device 136 is a keyboard, the CPU 131 waits for an input of a deposit declaration key assigned to the keyboard. When the input device 136 is a mouse, the CPU 131 waits until a deposit declaration icon displayed on the display device 137 is clicked.

When the user who deposits the bag comes to the counter, the person in charge of the counter operates the input device 136, and inputs the deposit declaration key or clicks the deposit declaration icon. In doing so, when the deposit declaration is received (YES in Act 1), the CPU 131 clears a pair of work memories WM1 and WM2 (Act 2). The work memories WM1 and WM2 are allocated in the RAM 133.

The CPU 131 waits until the barcode data is input (Act 3). When the barcode is read by the barcode reader 138 (YES in Act 3), the CPU 131 identifies that the barcode data is the radio device ID or the alarm device ID (Acts 4 and 5). Different classification flags are respectively included in the barcode 111 of the radio device ID assigned to each radio device 110, and the barcode 121 of the alarm device ID assigned to each alarm device 120. The CPU 131 may identify that the barcode data is either the radio device ID or the alarm device ID by recognizing these classification flags.

When the barcode data is neither the radio device ID nor the alarm device ID (NO in Act 4, and NO in Act 5), the CPU 131 waits until the barcode data is input again (Act 3).

When the barcode data is the radio device ID (YES in Act 4), the CPU 131 stores the radio device ID in the work memory WM1 (Act 6). When the barcode data is the alarm device ID (YES in Act 5), the CPU 131 stores the alarm device ID in the work memory WM2 (Act 7).

The CPU 131 checks whether the radio device ID and the alarm device ID are associated with each other (Act 8). When the radio device ID and the alarm device ID are respectively stored in the pair of work memories WM1 and WM2, the CPU 131 determines that these device IDs are associated with each other. When only any one of these device IDs is stored, the CPU determines that these device IDs are not associated with each other. When these device IDs are not associated with each other (NO in Act 8), the CPU 131 waits until the barcode data is input again (Act 3).

When these device IDs are associated with each other (YES in Act 8), the CPU 131 obtains date and time data measured by the clock 134 as a date and time when the user deposits the bag (Act 9). The CPU 131 creates a recode of the baggage management file 300 including the radio device ID of the work memory WM1, the alarm device ID of the work memory WM2, and the deposit date and time data obtained in the process of Act 8. The CPU 131 additionally registers the record in the baggage management file 300 (Act 10: association unit).

Figure 9:
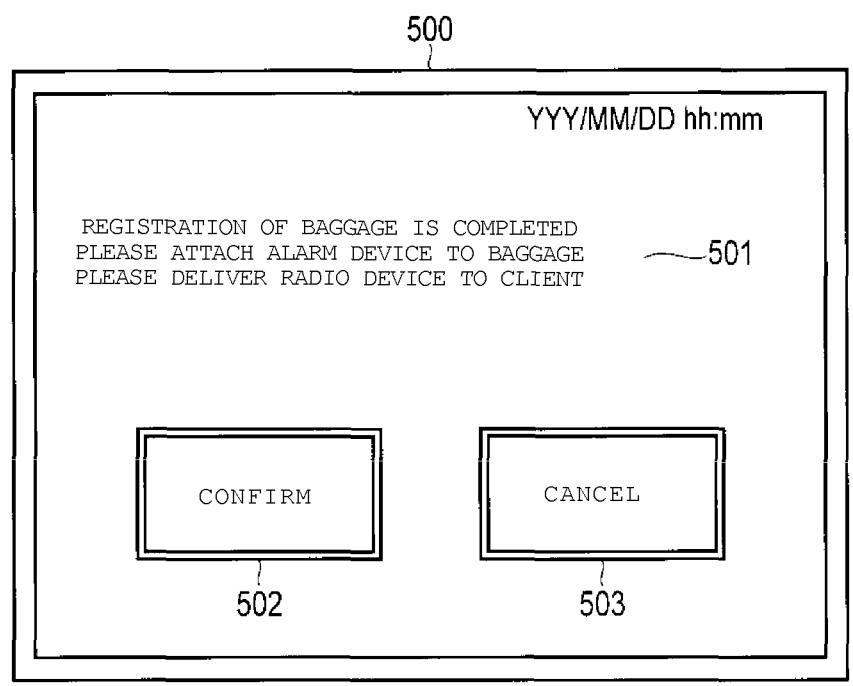
FIG. 9 illustrates an example layout of a guide screen.

When the registration of the recode in the baggage management file 300 is complete, the CPU 131 displays a guide screen 500 having, for example, a layout shown in FIG. 9 on the display device 137 (Act 11). As shown in FIG. 9, the guide screen 500 displays a guide message 501 that provides instructions for the person in charge of the counter who keeps the bag of the user. A confirm button 502 for input when the deposit of the bag from the user is confirmed, and a cancel button 503 for input when the deposit of the bag from the user is cancelled are displayed. The layout of the guide screen 500 is not limited to the layout shown in FIG. 9. For example, these buttons may be keys that are previously assigned to the keyboard without displaying the confirm button 502 and the cancel button 503.

The person in charge of the counter who checks the guide screen 500 correlates the alarm device 120 of which the barcode is read by the barcode reader 138 and the bag deposited by the user. For example, the person in charge of the counter attaches the alarm device 120 to the bag. The person in charge of the counter passes the radio device 110 of which the barcode is read by the barcode reader 138 to the user. Thereafter, the person in charge of the counter operates the input device 136, and inputs the confirm button 502. When the user wishes to cancel the deposit of the bag, the person in charge of the counter operates the input device 136, and inputs the cancel button 503.

The CPU 131 that displays the guide screen 500 waits until the cancel button 503 is input or the confirm button 502 is input (Acts 12 and 13). When the cancel button 503 is input (YES in Act 12), the CPU 131 deletes the latest record registered in the baggage management file 300 in the process of Act 10 (Act 14). The CPU 131 cancels the guide screen 500 (Act 15), and ends the process subsequent to the deposit declaration.

When the confirm button 502 is input (YES in Act 13), the CPU 131 cancels the guide screen 500 without deleting the recode of the baggage management file 300 (Act 15), and ends the process subsequent to the deposit declaration.

Thereafter, the CPU 131 waits for the next deposit declaration (Act 1).

Figure 6:
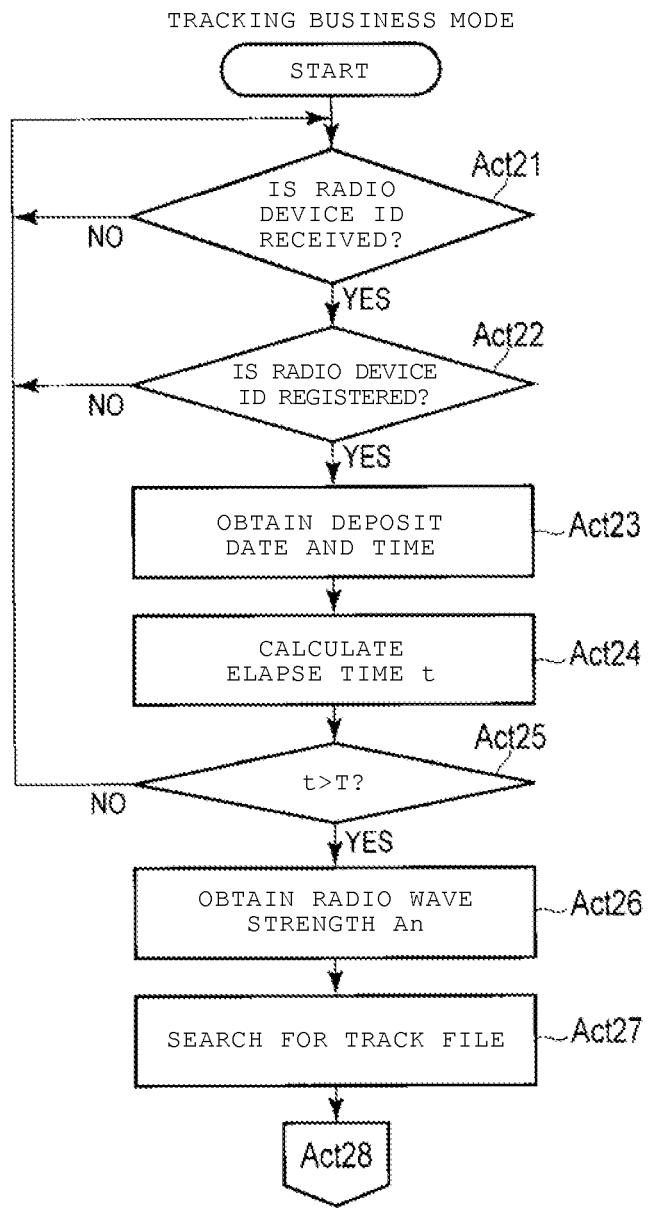
FIGS. 6 and 7 are flowcharts illustrating an example processing procedure of a tracking business.
Figure 7:
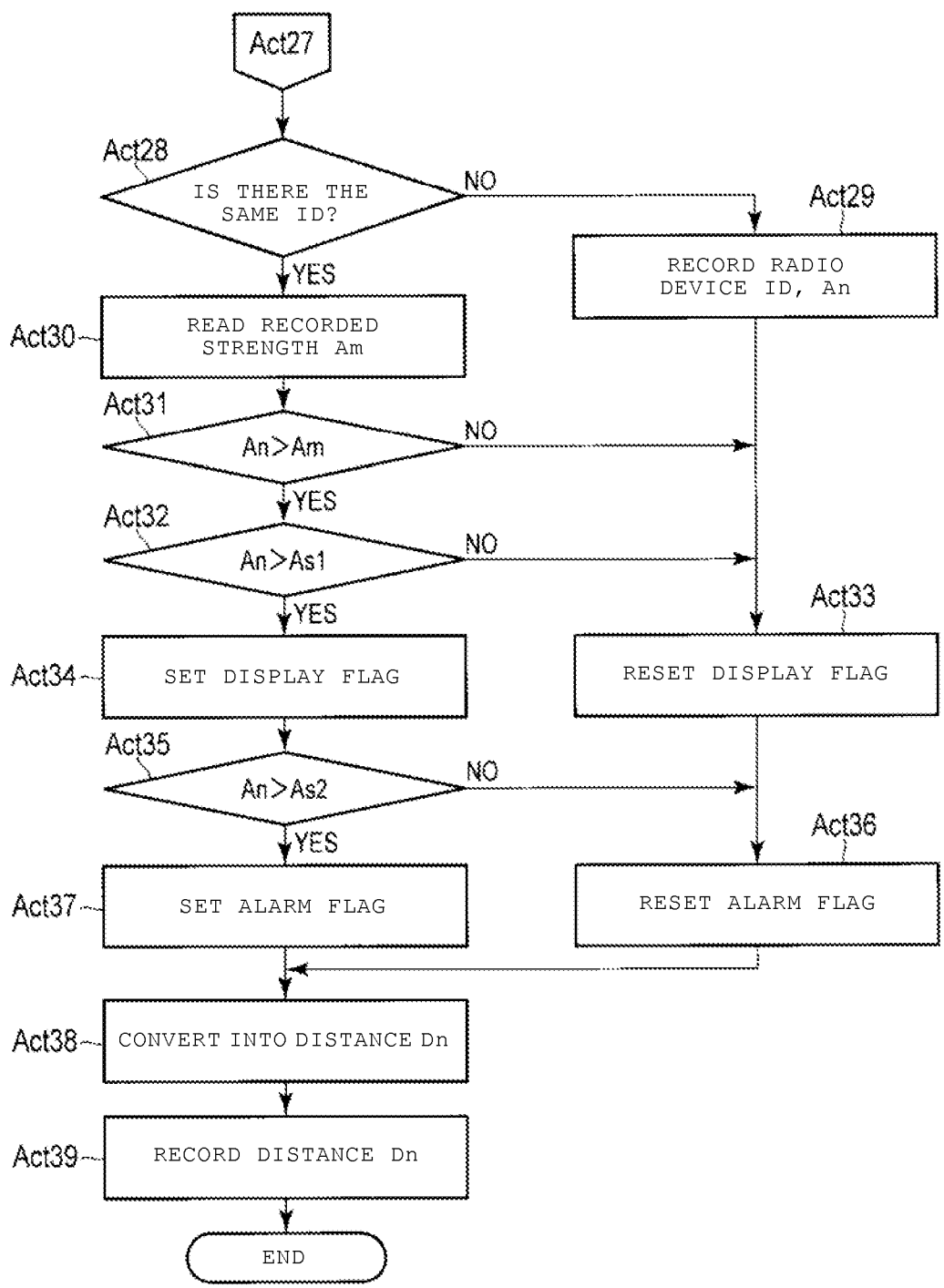

Next, the tracking business mode will be described with reference to the flowcharts of FIGS. 6 and 7.

When the baggage management device 130 is booted up, an application program that controls the tracking business mode starts. When this program starts, the CPU 131 starts the processes of FIGS. 6 and 7. First, the CPU 131 waits until the radio device ID is received (Act 21). When the beacon signal that is periodically transmitted from the radio device 110 is received by the radio unit 139A, the CPU 131 recognizes that the radio device ID is received (YES in Act 21). The CPU 131 checks whether the record including the radio device ID assigned to the beacon signal is registered in the baggage management file 300 (Act 22). When the record is not registered, the received radio device ID may be regarded as being transmitted from the unused radio device 110. In this case (NO in Act 22), the CPU 131 waits until the next radio device ID is received (Act 21).

When the corresponding record is registered in the baggage management file 300 (YES in Act 22), the CPU 131 obtains the deposit date and time data from this record (Act 23). The CPU 131 calculates an elapsed time t from the deposit date and time to a current date and time measured by the clock 134 (Act 24).

The CPU 131 checks whether the elapse time t is greater than a determination time T (Act 25). The determination time T is an enough time for the user who deposits the bag to go outside of the wireless communication area of the antenna ANT1, and is arbitrarily set.

When the elapse time t is equal to or less than the determination time T, the received radio device ID may be regarded as being transmitted from the radio device 110 carried by the user who just deposited the bag. In this case (NO in Act 25), the CPU 131 waits until the next radio device ID is received (Act 21).

When the elapse time t is greater than the determination time T, the received radio device ID may be regarded as being transmitted from the radio device 110 carried by the user who comes to pick up the bag. In this case (YES in Act 25), the CPU 131 obtains a radio wave strength An (db) detected by the strength detecting circuit 140 (Act 26).

When the radio wave strength An (db) is obtained, the CPU 131 searches for the track file 400 (Act 27). The CPU 131 checks whether the record including the received radio device ID is registered in the track file 400 (Act 28). When the record is not registered, the received radio device ID may be regarded as being transmitted from the radio device 110 carried by the user who just enters within the wireless communication area of the antenna ANT1. In this case (NO in Act 28), the CPU 131 registers the record including the radio device ID and the radio wave strength An (db) in the track file 400 (Act 29). The CPU 131 resets the display flag F1 of the record as "0" (Act 33). The CPU 131 resets the alarm flag F2 of the record as "0" (Act 36). The CPU 131 converts the radio wave strength An (db) into a relative distance Dn (m) between the radio device 110 and the antenna ANT1 by referring to the conversion table 200 (Act 38), and the CPU 131 records the relative distance Dn (m) in the corresponding record (Act 39). The process subsequent to the reception of the radio device ID ends.

When the record including the received radio device ID is registered in the track file 400, the received radio device ID may be regarded as being transmitted from the radio device 110 carried by the user who moves within the wireless communication area of the antenna ANT1. In this case (YES in Act 28), the CPU 131 reads the radio wave strength Am (db) recorded in the record (Act 30). The CPU 131 compares the radio wave strength Am (db) with the radio wave strength An (db) obtained in the process of Act 26 (Act 31: check unit).

When the radio wave strength An (db) is equal to or less than the radio wave strength Am (db), that is, when the radio wave strength becomes weaker with time, it may be considered that the user goes away from the counter of the baggage office. In this case (NO in Act 31), the CPU 131 resets the display flag F1 of the record as "0" (Act 33). The CPU 131 resets the alarm flag F2 of the record as "0" (Act 36). The CPU 131 converts the radio wave strength An (db) into the relative distance Dn (m) between the radio device 110 and the antenna ANT1 by referring to the conversion table 200 (Act 38), and the CPU 131 records the relative distance Dn (m) in the corresponding record (Act 39). The process subsequent to the reception of the radio device ID ends.

When the radio wave strength An (db) is greater than the radio wave strength Am (db), that is, when the radio wave strength becomes strong with time, it may be considered that the user approaches the counter of the baggage office. In this case (YES in Act 31), the CPU 131 checks whether or not the radio wave strength An (db) is greater than a first threshold value As1 (db) (Act 32: check unit). The first threshold value As1 (db) is, for example, radio wave reception strength from the radio device 110 when the relative distance between the antenna ANT1 and the radio device is 50 m.

When the radio wave strength An (db) is equal to or less than the first threshold value As1 (db), it may be considered that the user does not approach within a range of 50 m from the counter. In this case (NO in Act 32), the CPU 131 resets the display flag F1 of the record including the received radio device ID as "0" (Act 33). The CPU 131 resets the alarm flag F2 of the record as "0" (Act 36). The CPU 131 converts the radio wave strength Am (db) into the relative distance Dn (m) between the radio device 110 and the antenna ANT1 by referring to the conversion table 200 (Act 38), and the CPU 131 records the relative distance Dn (m) in the corresponding record (Act 39). The process subsequent to the reception of the radio device ID of the radio device ID ends.

When the radio wave strength An (db) is greater than the first threshold value As1 (db), it is considered that the user approaches within a range of 50 m from the counter. In this case (YES in Act 32), the CPU 131 sets the display flag F1 of the record including the received radio device ID as "1" (Act 34).

Subsequently, the CPU 131 checks whether or not the radio wave strength An (db) is greater than a second threshold value As2 (db) (Act 35: check unit). The second threshold value As2 (db) is, for example, radio wave reception strength from the radio device 110 when the relative distance between the antenna ANT1 and the radio device is 30 m.

When the radio wave strength An (db) is equal to or less than the second threshold value As2 (db), it may be considered that the user does not approach within a range of 30 m from the counter. In this case (NO in Act 35), the CPU 131 resets the alarm flag F2 of the record including the received radio device ID as "0" (Act 36). The CPU 131 converts the radio wave strength Am (db) into the relative distance Dn (m) between the radio device 110 and the antenna ANT1 by referring to the conversion table 200 (Act 38), and the CPU 131 registers the relative distance Dn (m) in the corresponding record (Act 39). The process subsequent to the reception of the radio device ID ends.

When the radio wave strength An (db) is greater than the threshold value As2 (db), it may be considered that the user approaches within a range of 30 m from the counter. In this case (YES in Act 35), the CPU 131 sets the alarm flag F2 of the record including the received radio device ID as "1" (Act 37). The CPU 131 converts the radio wave strength Am (db) into the relative distance Dn (m) between the radio device 110 and the antenna ANT1 by referring to the conversion table 200 (Act 38), and the CPU 131 records the relative distance do (m) in the corresponding record (Act 39). The process subsequent to the reception of the radio device ID ends.

Thereafter, the CPU 131 waits until the next radio device ID is received (Act 21).

As long as the relationship of As1<As2 is maintained, the first threshold value As1 and the second threshold value As2 may be arbitrarily set.

Figure 8:
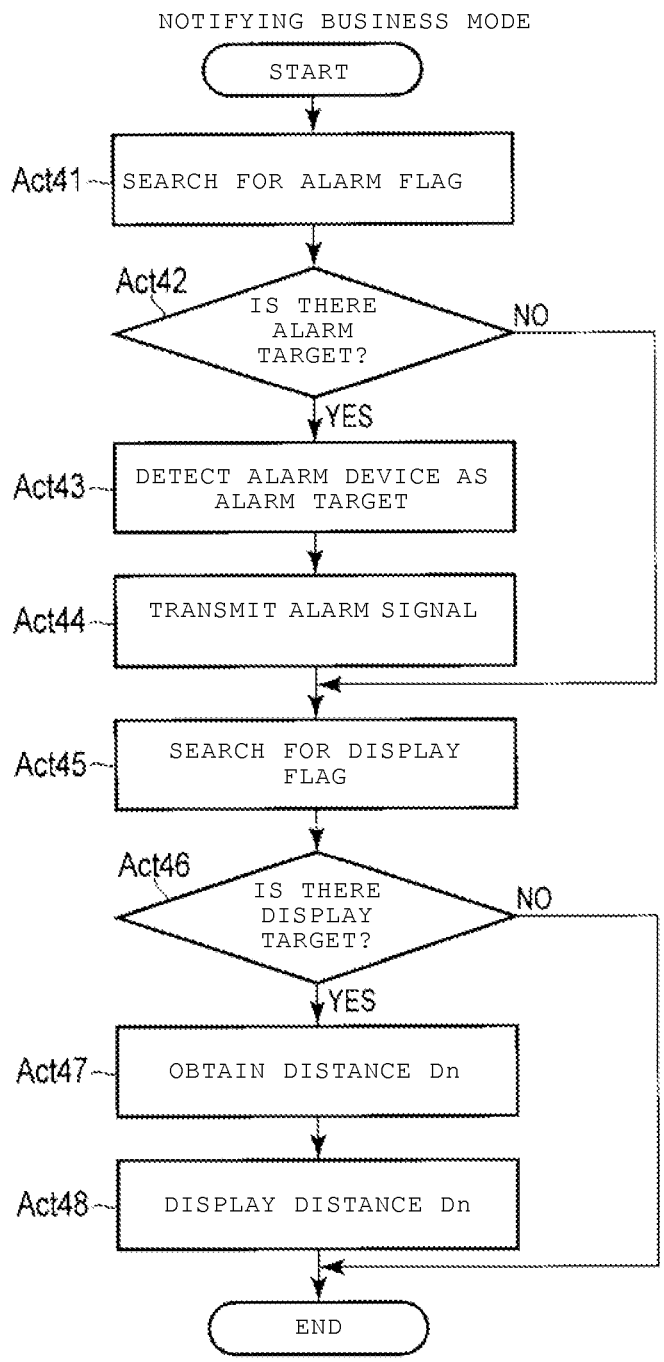
FIG. 8 is a flowchart illustrating an example processing procedure of a notifying business.

Next, the notifying business mode will be described with reference to FIG. 8.

An application program that controls the notifying business starts in response to an interrupt signal generated at a predetermined interval (for example, an interval of one second). When this program starts, the CPU 131 starts the process of FIG. 8. First, the CPU 131 searches for alarm flags F2 of the respective records recorded in the track file 400 (Act 41). The CPU 131 checks whether or not the record of which the alarm flag is set as "1" is present (Act 42).

When the record of which the alarm flag is set as "1" is present, this record is a record which is an alarm target. In this case (YES in Act 42), the CPU 131 searches for the baggage management file 300 by using the radio device ID of this record, and detects the alarm device ID associated with the corresponding radio device ID (Act 43). The CPU 131 transmits the alarm signal including the alarm device ID from the antenna ANT2 through the radio unit 139B (Act 44: control unit).

When the record of which the alarm flag is set as "1" is plural in number, the CPU 131 searches for the baggage management file 300 by using the radio devices ID of the respective records, and detects all alarm device IDs associated with the corresponding radio device IDs. The CPU 131 may transmit alarm signals, each including the respective alarm device IDs, from the antenna ANT2 through the radio unit 139B in a time division manner.

By transmitting the alarm signal including the alarm device ID, the alarm device 120 to which the alarm device ID is set provides an alarm notice by sound and/or light. The bag to which the alarm device 120 that provides the alarm notice is attached is a bag deposited by the user approaching within a range of 30 m from the counter. Accordingly, before the user comes to the counter, the person in charge of the counter or the person in charge of the baggage office may find the bag deposited by the user, and may deliver the bag to the counter. As a result, since time required to deliver the bag to the counter may be reduced, it is possible to achieve an efficient counter service.

After the alarm signal is transmitted, or when the record which is an alarm target is not present (NO in Act 42), the CPU 131 searches for the display flag F1 of the track file 400 (Act 45). The CPU 131 checks whether or not the record of which the display flag is set as "1" is present (Act 46). When the record of which the display flag is set as "1" is not present (NO in Act 46), the process ends.

When the record of which the display flag is set as "1" is present, this record is a record which is a display target. In this case (YES in Act 46), the CPU 131 obtains the radio device ID and the distance Dn from this record. In this case, when the record of which the display flag is set as "1" is plural in number, the CPU obtains the radio device ID and the distance Dn from each record (Act 47). The CPU 131 displays, for example, a notification screen 600 shown in FIG. 10 on the display device 137 based on the data obtained from the track file 400 (Act 48).

Figure 10:
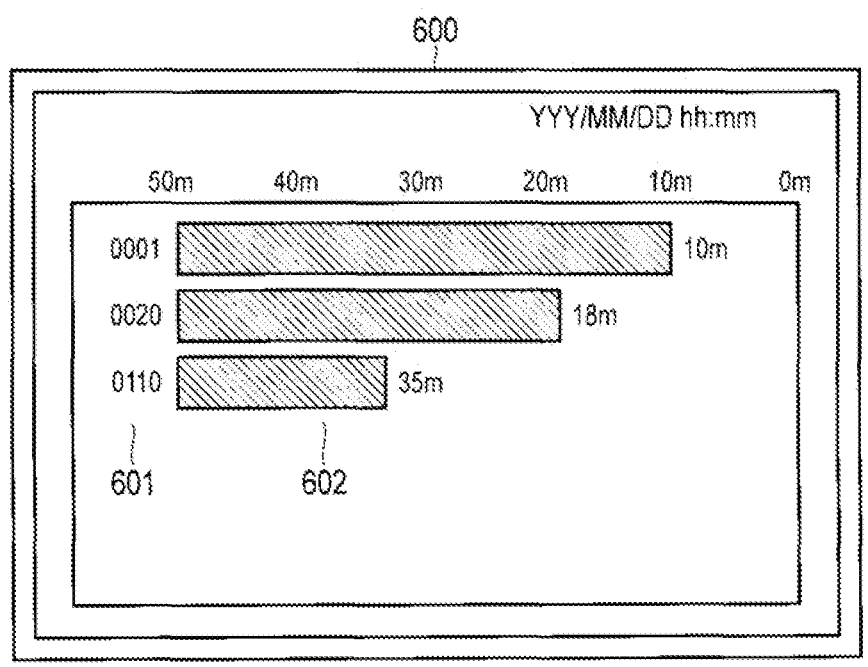
FIG. 10 illustrates an example layout of a notification screen.

As shown in FIG. 10, a radio device ID 601 and an indicator 602 indicating the distance Dn (m) are displayed on the notification screen 600 by correlating with each other. When 50 m—which is the relative distance between the antenna ANT1 and the radio device and corresponds to the first threshold value As1 (db)—is used as a reference, the distance and the indicator are displayed such that, as the distance becomes shorter than the reference value, the indicator becomes long. Accordingly, the person in charge of the counter or the person in charge of the baggage office who checks the notification screen 600 may visually check information indicating how many users come to pick up bags or how near users approach the counter. As a result, when many users come to pick up bags, since the person in charge of the counter copes with an appropriate response such as preparation by increasing the number of persons in charge of the counter, it is possible to more effectively process the counter service.

The layout of the notification screen 600 is not limited to the layout shown in FIG. 10. For example, the distance may be displayed as a value of the distance not an indicator. The alarm device ID associated with the radio device ID may be displayed without displaying the radio device ID.

Second Embodiment

Figure 11:
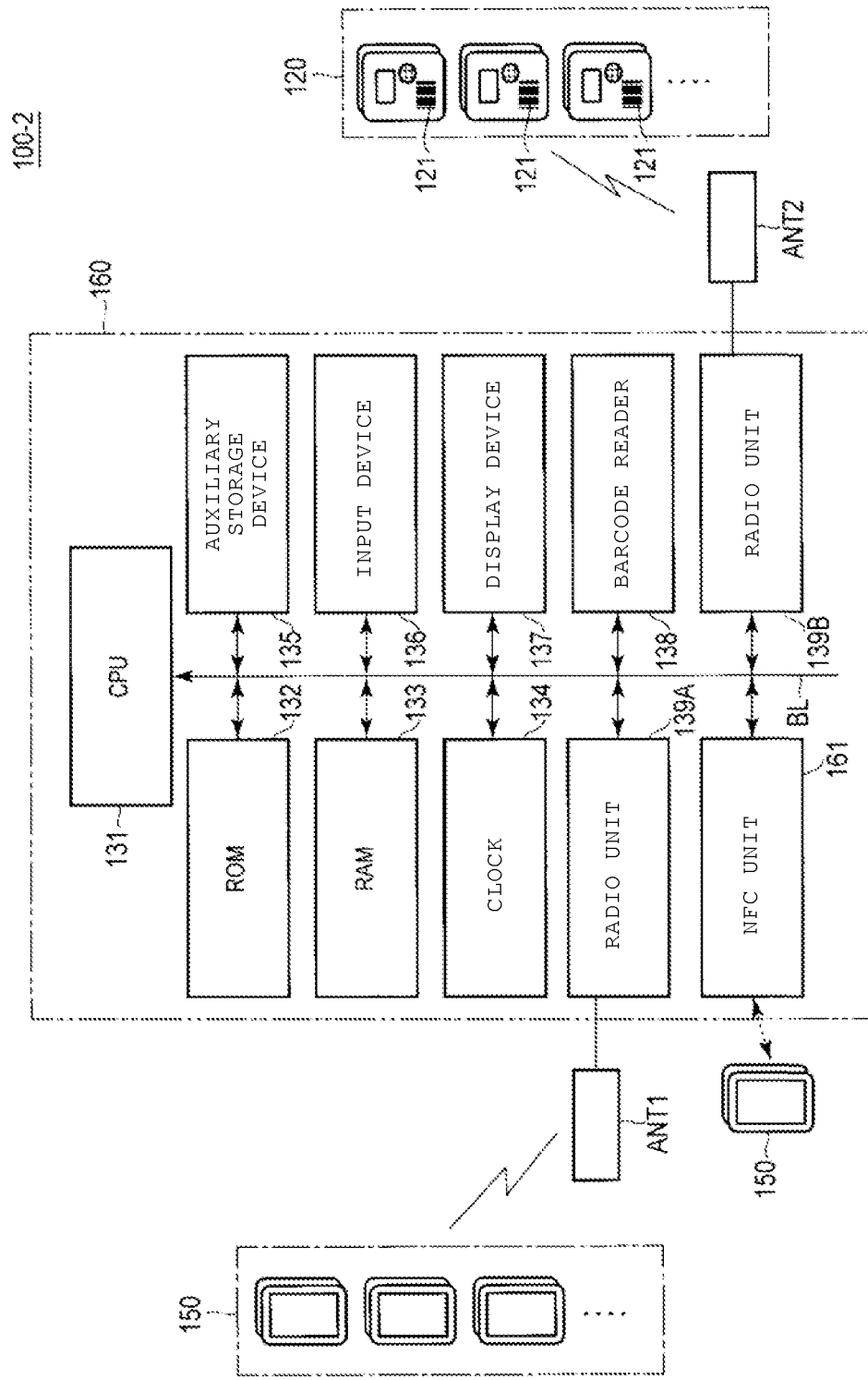
FIG. 11 is a schematic diagram showing an example configuration of a baggage management system according to a second embodiment.

FIG. 11 is a schematic diagram showing the entire configuration of a baggage management system 100-2 according to a second embodiment. The same parts as those in the first embodiment shown in FIG. 1 are assigned the same reference numerals, and the detailed description thereof will be omitted.

The baggage management system 100-2 includes a plurality of communication terminals 150, a plurality of alarm devices 120, and a baggage management device 160.

The communication terminal 150 is a portable electronic device such as a smart phone, or a tablet personal computer (PC), and has a wireless communication function such as Bluetooth (registered trademark) and a near-field wireless communication function according to a near field communication (NFC) standard. The wireless communication function may detect the strength of a reception radio wave. The communication terminal 150 is carried by the user who uses the baggage office. The user installs a dedicated application program (hereinafter, referred to as a baggage management program) on the communication terminal 150 by using the Internet before using the baggage office.

The baggage management device 160 includes an NFC unit 161 in addition to the CPU 131, the ROM 132, the RAM 133, the clock 134, the auxiliary storage device 135, the input device 136, the display device 137, the barcode reader 138, the first radio unit 139A and the second radio unit 139B. The NFC unit 161 is connected to the bus line BL.

The NFC unit 161 performs data communication with an NFC device held over the baggage management device 160 according to the NFC standard. In the present embodiment, the communication terminal 150 is the NFC device.

Figure 12:
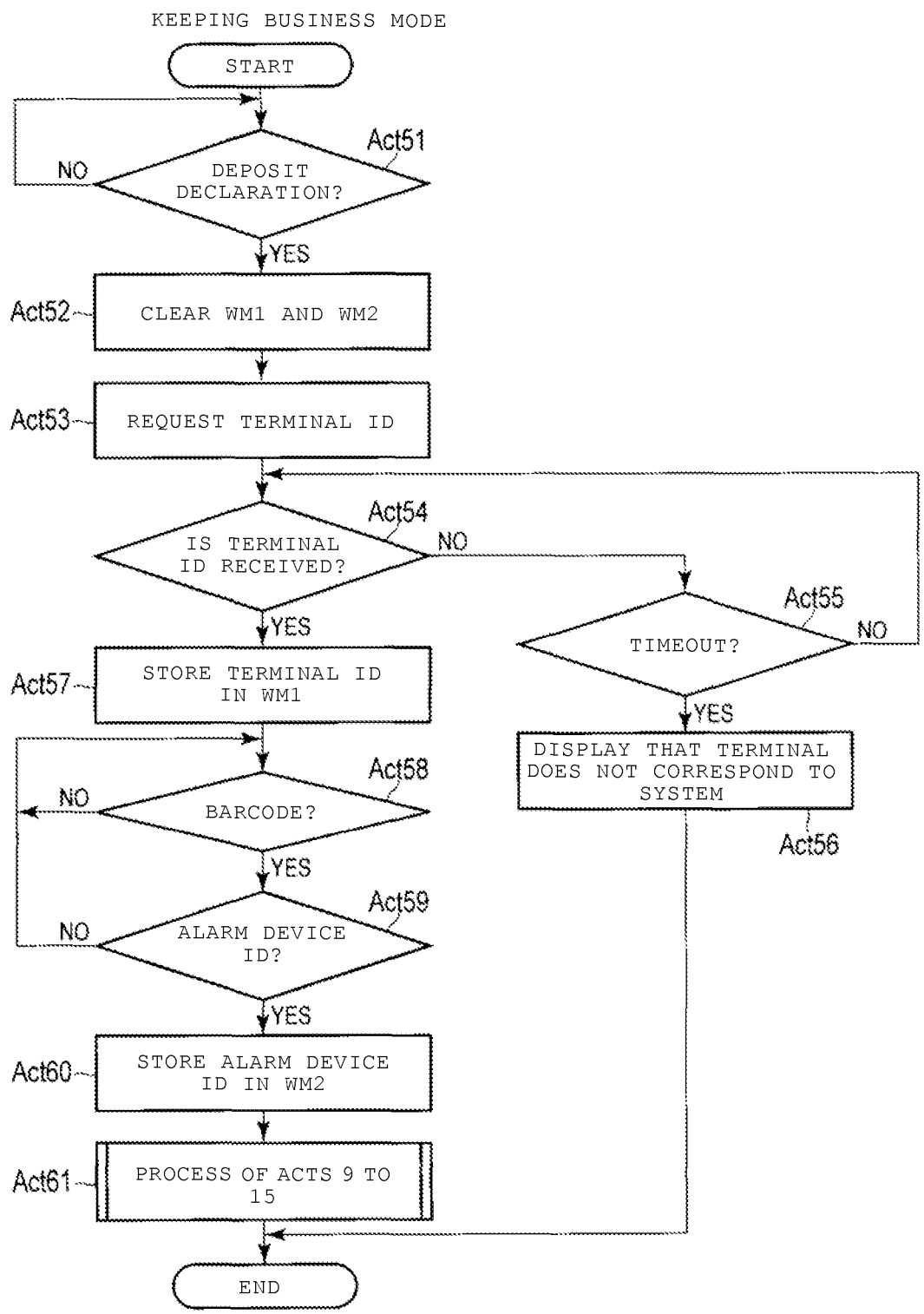
FIG. 12 is a flowchart illustrating an example processing procedure of a keeping business.

Similarly to the first embodiment, the baggage management device 160 has three business modes including the keeping business mode, the tracking business mode and the notifying business mode. Among these modes, the notifying business mode is performed according to the same procedure as that of the baggage management device 130 according to the first embodiment. The keeping business mode and the tracking business mode are different from the processing procedures of the baggage management device 130. In the following description, the keeping business mode and the tracking business mode of the baggage management device 160 will be described. First, the keeping business mode will be described with reference to the flowchart of FIG. 12.

Similarly, in order to perform the respective businesses, the baggage management device 160 requires the conversion table 200 shown in FIG. 2, the baggage management file 300 shown in FIG. 3, and the track file 400 shown in FIG. 4.

When the baggage management device 160 is booted up, an application program that controls the keeping business starts. When this program starts, the CPU 131 starts the process of FIG. 12. First, the CPU 131 waits for deposit declaration (Act 51). When the deposit declaration is received (YES in Act 51), the CPU 131 clears a pair of work memories WM1 and WM2 (Act 52).

The CPU 131 controls the NFC unit 161 to transmit a request command of a terminal ID (Act 63). In response to this command, the baggage management device 160 may receive a terminal ID set to the NFC device held over near the NFC unit 161. Thus, the person in charge of the counter holds over the communication terminal 150 of the user who deposits the bag near the NFC unit 161. In so doing, the terminal ID that is previously set to the communication terminal 150 is transmitted to the baggage management device 160 from the communication terminal 150 through NFC communication.

The CPU 131 waits until the terminal ID is received (Act 54). During the waiting, the CPU 131 measures a time elapsed after the request command is transmitted using a timer, and monitors whether or not a timeout occurs (Act 55). When the timeout has occurred before the terminal ID is received (YES in Act 55), the CPU 131 displays information indicating that the communication terminal 150 does not correspond to the baggage management system. 100-2 on the display device 137 (Act 56). The process subsequent to the deposit declaration ends.

Before the timeout occurs, when the terminal ID is received through the NFC unit 161 (YES in Act 54), the CPU 131 stores this terminal ID in the work memory WM1 (Act 57).

The CPU 131 waits until barcode data is input (Act 58). When a barcode is read by the barcode reader 138 (YES in Act 58), the CPU 131 checks whether or not this barcode data is the alarm device ID (Act 59). When the barcode data is not the barcode device ID (NO in Act 59), the CPU 131 waits until barcode data is input again (Act 58). When the barcode data is the alarm device ID (YES in Act 59), the CPU 131 stores this alarm device ID in the work memory WM2 (Act 60).

Thereafter, the CPU 131 performs the same processes as Acts 9 to 15 in the keeping business according to the first embodiment (Act 61). Through these processes, the CPU 131 associates the terminal ID of the communication terminal 150 carried by the user with the alarm device ID of the alarm device 120 attached to the bag deposited by the user. The CPU 131 creates a record of the baggage management file 300 including the terminal ID, the alarm device ID and the deposit date and time, and registers the record in the baggage management file 300. The process subsequent to the reception of the deposit declaration ends.

Figure 13:
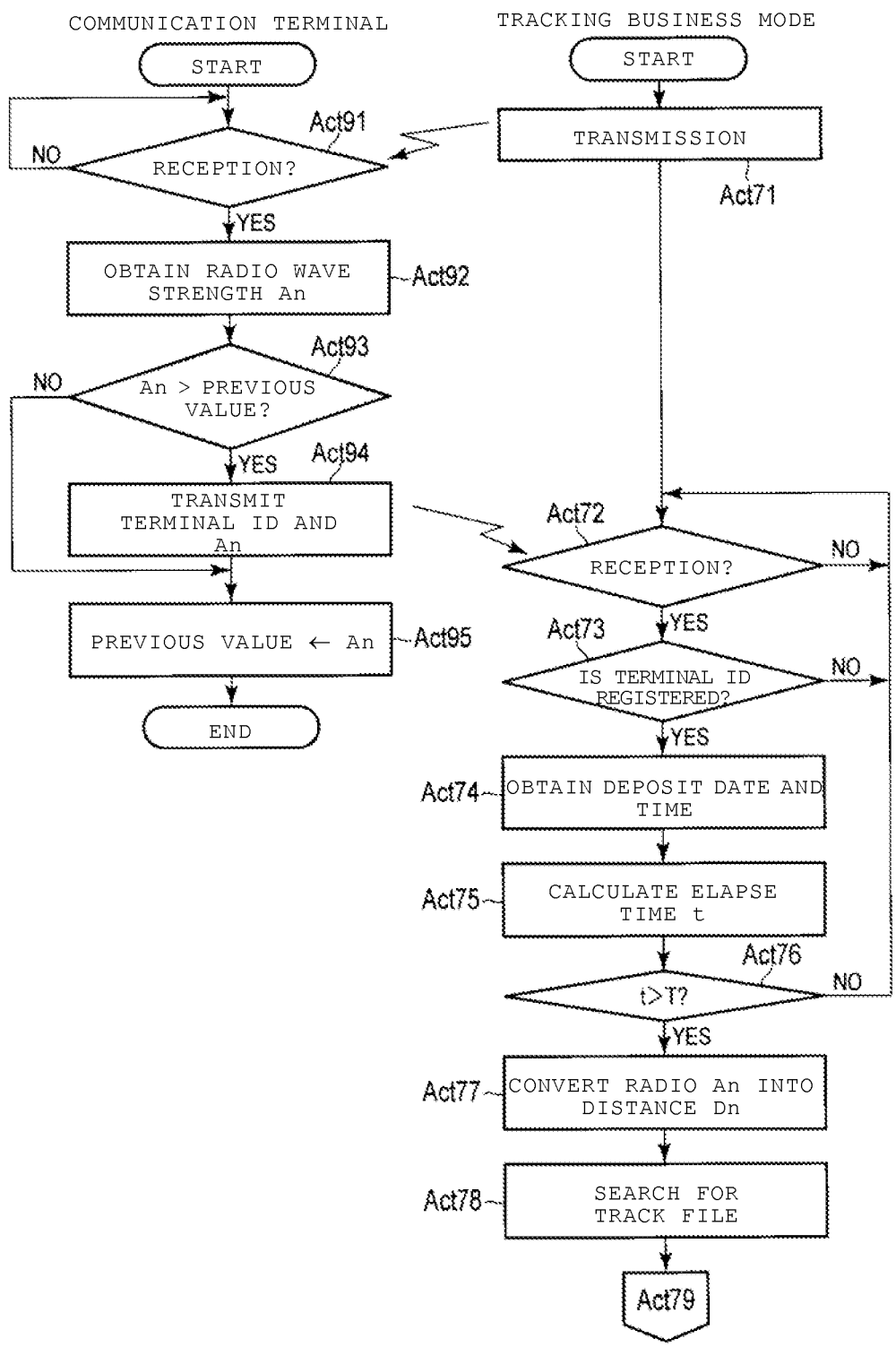
FIG. 13 is a flowchart illustrating an example processing procedure of a tracking business.
Figure 14:
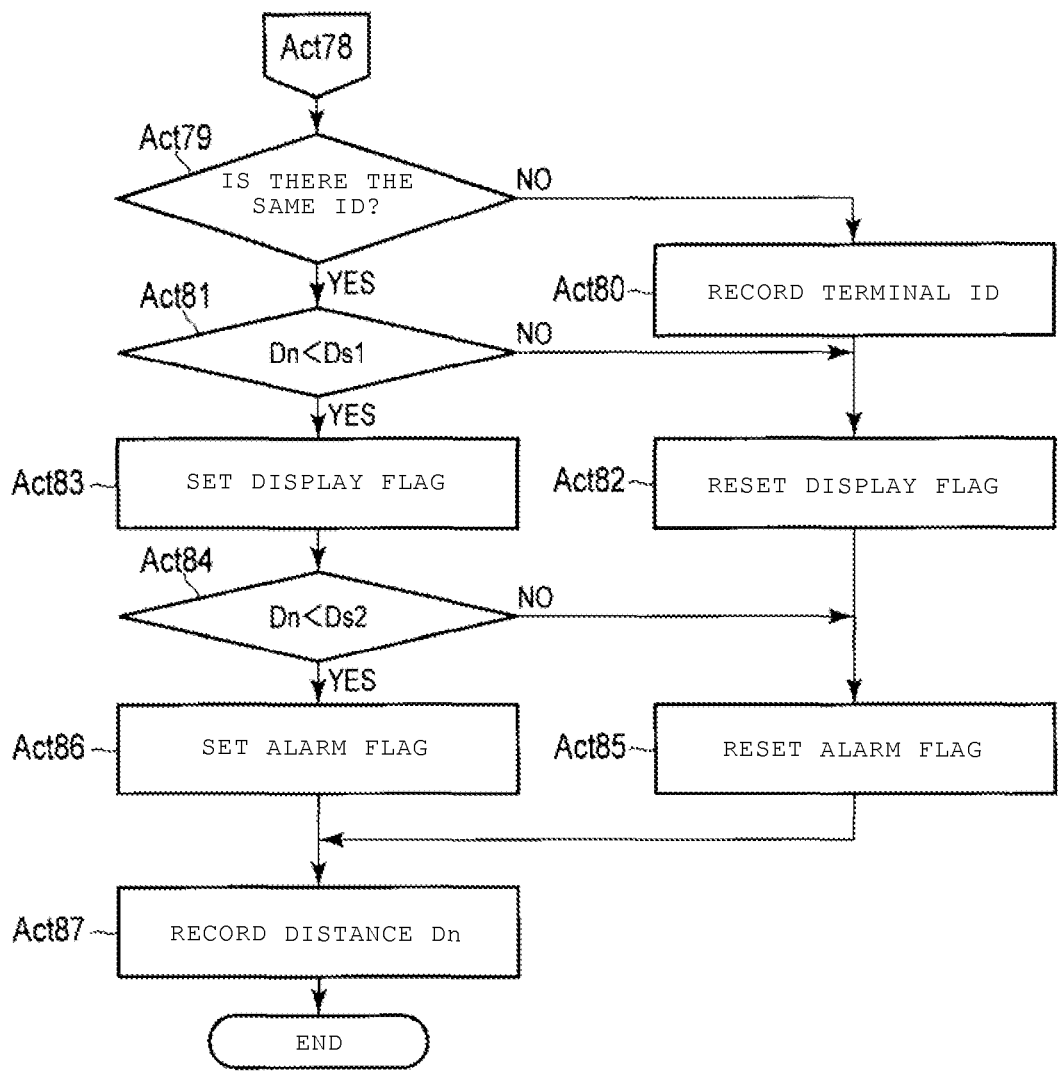
FIG. 14 is a flowchart illustrating an example processing procedure of the tracking business.

Next, the tracking business mode will be described with reference to the flowcharts of FIGS. 13 and 14. In FIG. 13, the flowchart on the right side shows the processing procedure performed by the CPU 131 of the baggage management device 160, and the flowchart on the left side shows the processing procedure performed by a processor of the communication terminal 150 according to the baggage management program.

When the baggage management device 160 is booted up, an application program that controls the tracking business starts. When this program starts, the CPU 131 starts the processes of FIGS. 13 and 14. First, the CPU 131 transmits an inquire command of the terminal ID from the antenna ANT1 through the radio unit 139A (Act 71).

The processor of the communication terminal 150 waits for the inquire command (Act 91). When the inquire command is received by the wireless communication function (YES in Act 91), the processor obtains a reception radio wave strength An (Act 92). The processor compares the current reception radio wave strength An with the previous value of the reception radio wave strength stored in a previous value memory (Act 93). It is assumed that an initial value of the previous value memory is infinite.

When the reception radio wave strength An is equal to or less than the previous value (NO in Act 93), the processor rewrites the value of the previous value memory into the current value (Act 95). When the reception radio wave strength An is greater than the previous value (YES in Act 93), the processor generates a response command including the reception radio wave strength An and the terminal ID of the communication terminal. The processor transmits the response command to the baggage management device 160 which is a transmission source of the inquire command by the wireless communication function (Act 94). Thereafter, the processor rewrites the value of the previous value memory into the current value (Act 95).

As mentioned above, the communication terminal 150 on which the baggage management program is installed obtains the reception radio wave strength An whenever the inquire command is received while the communication terminal is present within the wireless communication area of the antenna ANT1, and stores the latest value in the previous value memory. Whenever the reception radio wave strength An becomes strong, the communication terminal 150 transmits the response command including the reception radio wave strength An and the terminal ID of the communication terminal to the baggage management device 160. Here, the communication terminal 150 functions as a first radio device that transmits a unique ID in response to the reception of the radio wave transmitted from the second radio device (radio unit 139A and the antenna ANT1).

The CPU 131 that transmits the inquire command waits for a response command from the communication terminal 150 (Act 72). When the response command is received (YES in Act 72), the CPU 131 checks whether or not the terminal ID included in this response command is registered in the baggage management file 300 (Act 73). When the terminal ID is not registered, the received terminal ID may be regarded as being transmitted from the communication terminal 150 carried by the person who does not deposit the bag. In this case (NO in Act 73), the CPU 131 waits until the next terminal ID is received (Act 72).

When the terminal ID included in the response command is registered in the baggage management file 300 (YES in Act 73), the CPU 131 obtains deposit date and time data from the record including the terminal ID (Act 74). The CPU 131 calculates an elapse time t from the deposit date and time to current date and time measured by the clock 134 (Act 75).

The CPU 131 checks whether the elapse time t is greater than a determination time T (Act 76). When the elapse time t is equal to or less than the determination time T, the received terminal ID may be regarded as being transmitted from the communication terminal 150 carried by the user who just deposits the bag. In this case (NO in Act 76), the CPU 131 waits that the next terminal ID is received (Act 72).

When the elapse time t is greater than the determination time T, the received terminal ID may be regarded as being transmitted from the communication terminal 150 carried by the user who comes to pick up the bag. In this case (YES in Act 76), the CPU 131 obtains the reception radio wave strength An from the received respond command. The CPU 131 converts the reception radio wave strength An (db) into the relative distance Dn (m) between the radio device 110 and the antenna ANT1 by referring to the conversion table 200 (Act 77).

The CPU 131 searches for the track file 400 (Act 78). The CPU checks whether or not the record including the received terminal ID is registered in the track file 400 (Act 79). When the recode is not registered, the received terminal ID may be regarded as being transmitted from the communication terminal 150 carried by the user who just enters within the wireless communication area of the antenna ANT1. In this case (NO in Act 79), the CPU 131 registers the record including the terminal ID in the track file 400 (Act 80). The CPU 131 resets the display flag F1 of the record as "0" (Act 82). The CPU 131 resets the alarm flag F2 of the record as "0" (Act 85). The CPU 131 records the relative distance Dn (m) in the record (Act 87). The process subsequent to the reception of the terminal ID ends.

When the record including the received terminal ID is registered in the track file 400, the received terminal ID may be regarded as being transmitted from the communication terminal 150 carried by the user who moves within the wireless communication area of the antenna ANT1. In this case (YES in Act 79), the CPU 131 checks whether the relative distance Dn (m) obtained in the process of Act 77 is greater than a first threshold value Ds1 (for example, 50 m) (Act 81: check unit).

When the relative distance Dn (m) is equal to or greater than the first threshold value Ds1 (NO in Act 81), the CPU 131 resets the display flag F1 of the record including the received terminal ID as "0" (Act 82). The CPU 131 resets the alarm flag F2 of the record as "0" (Act 85). The CPU 131 records the relative distance Dn (m) in the corresponding record (Act 87). The process subsequent to the reception of the terminal ID ends.

When the relative distance Dn (m) is less than the first threshold value Ds1 (YES in Act 81), the CPU 131 sets the display flag F1 of the record including the received terminal ID as "1" (Act 83).

Subsequently, the CPU 131 checks whether the relative distance Dn (m) is less than a second threshold value Ds2 (for example, 30 m) (Act 84: check unit). When the relative distance Dn (m) is equal to or greater than the second threshold value Ds2 (NO in Act 84), the CPU 131 resets the alarm flag F2 of the record including the received terminal ID as "0" (Act 85). The CPU 131 records the relative distance Dn (m) in the corresponding record (Act 87). The process subsequent to the reception of the terminal ID ends.

When the relative distance Dn is less than the second threshold Ds2 (YES in Act 84), the CPU 131 sets the alarm flag F2 of the record including the received terminal ID as "1" (Act 86). The CPU 131 records the relative distance Dn (m) in the corresponding record (Act 87). The process subsequent to the reception of the terminal ID ends.

The monitoring process is the same as that in the first embodiment. Accordingly, in the second embodiment, it is possible to reduce time required to deliver the bag, and it is possible to achieve an efficient counter service.

In addition, in the second embodiment, since the communication terminal 150 such as the smart phone carried by the user may be used as the first radio device, it is not necessary to prepare the radio device 110. Alternatively, it may also be considered that the radio device 110 and the communication terminal 150 are used together. However, in such a case, since the number of radio devices 110 may be reduced, an effect of reducing costs required to establish a system is exhibited.

The present invention is not limited to the exemplary embodiments.

In the tracking business according to the first embodiment, the radio wave reception strength is compared with the threshold value. Meanwhile, in the tracking business according to the second embodiment, the radio wave reception strength is converted into the distance data, and the distance data is compared with the threshold value. In the tracking business according to the first embodiment, the radio wave reception strength may be converted into the distance data, and the distance data may be compared with the threshold value. Similarly, in the second embodiment, the radio wave reception strength may be compared with the threshold value.

The method of checking whether the relative distance between the first radio device and the second radio device is less than the predetermined distance is not limited to the method of using the radio wave reception strength. In short, any method may be used as long as the relative distance between the first radio device and the second radio device may be obtained.

In the exemplary embodiments, although it has been described that the first radio unit 139A and the second radio unit 139B are provided, these radio units may be provided as one unit. In this case, while a typical scheme such as Bluetooth (registered trademark) may be used as a communication scheme, one-directional communication may be used to perform communication with the radio device 110 or the communication terminal 150, and bi-directional communication may be used to perform communication with the alarm device 120. In order to obtain a long communication distance with the radio device 110 or the communication terminal 150, a diversity antenna may be used as the antenna ANT1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An item management apparatus comprising:
a reader that reads a first identification of a first radio device carried by a user and a second identification of an alarm device correlated with an item deposited by the user;
a memory that stores the first identification and the second identification read by the reader in association with each other;
a receiver that receives a first signal from the first radio device;
a processor that determines a distance to the first radio device based on the first signal; and
a transmitter that transmits a second signal for causing the alarm device having the second identification stored in association with first identification of the first radio device to provide an alarm notice if the distance to the first radio device is determined to be equal to or less than a predetermined distance.

2. The apparatus according to claim 1, further comprising:
a display unit, wherein
the processor controls the display unit to display a notification if the distance to the first radio device is determined to be equal to or less than the predetermined distance.

3. The apparatus according to claim 2, wherein
the processor controls the display unit to display a list which shows at least one of the first radio device and the alarm device associated with the first radio device, and an information indicating the distance to the first radio device.

4. The apparatus according to claim 1, wherein
the receiver includes an antenna which receives the first signal, and
the distance to the first radio device is a relative distance between the first radio device and the antenna.

5. The apparatus according to claim 4, wherein
the transmitter transmits a third signal, and
the first radio device receives the third signal and transmits a unique ID in response to the received third signal.

6. The apparatus according to claim 1, wherein
the memory stores a date and time in association with the first identification with the second identification,
the processor calculates an elapsed time based on the stored date and time and determines whether the calculated elapsed time is less than a predetermined time amount, and
if the calculated elapsed time is determined to be less than the predetermined time amount, the transmitter does not transmit the second signal.

7. The apparatus according to claim 1, wherein
the processor determines whether the distance to the first radio device is staying the same or increasing if the distance to the first radio device is determined to be equal to or less than the predetermined distance, and
if the distance to the first radio device is determined to be staying the same or increasing, the transmitter does not transmit the second signal.

8. The apparatus according to claim 1, wherein
the first radio unit is one of a smart phone and a tablet computer.

9. An item management system comprising:
a plurality of alarm devices including a first alarm device correlated with an item deposited by a user;

a reader that reads a first identification of a first radio device carried by the user and a second identification of the first alarm device;

a memory that stores the first identification and the second identification read by the reader in association with each other;

a receiver that receives a first signal from the first radio device;

a processor that determines a distance to the first radio device based on the first signal; and a transmitter that transmits a second signal for causing the first alarm device having the second identification stored in association with first identification of the first radio device to provide an alarm notice if the distance to the first radio device is determined to be equal to or less than a predetermined distance.

10. The system according to claim 9, further comprising:
a display unit, wherein
the processor controls the display unit to display a notification if the distance to the first radio device is determined to be equal to or less than the predetermined distance.

11. The system according to claim 10, wherein
the processor controls the display unit to display a list which shows at least one of the first radio device and the first alarm device associated with the first radio device, and an information indicating the distance to the first radio device.

12. The system according to claim 9, wherein
the receiver includes an antenna which receives the first signal, and
the distance to the first radio device is a relative distance between the first radio device and the antenna.

13. The system according to claim 12, wherein
the transmitter transmits a third signal, and
the first radio device receives the third signal and transmits a unique ID in response to the received third signal.

14. The system according to claim 9, wherein
the memory stores a date and time in association with the first identification with the second identification,
the processor calculates an elapsed time based on the stored date and time and determines whether the calculated elapsed time is less than a predetermined time amount, and
if the calculated elapsed time is determined to be less than the predetermined time amount, the transmitter does not transmit the second signal.

15. The system according to claim 9, wherein
the processor determines whether the distance to the first radio device is staying the same or increasing if the distance to the first radio device is determined to be equal to or less than the predetermined distance, and
if the distance to the first radio device is determined to be staying the same or increasing, the transmitter does not transmit the second signal.

16. The system according to claim 9, wherein
the first radio unit is one of a smart phone and a tablet computer.

17. An item management method comprising the steps of:
correlating an alarm device with an item deposited by a user;
reading a first identification of a first radio device carried by the user;
reading a second identification of the alarm device correlated with the item;
storing in a memory the first identification and the second identification in association with each other;
receiving a first signal from the first radio device;
determining a distance to the first radio device based on the first signal; and
transmitting a second signal if the distance to the first radio device is determined to be equal to or less than a predetermined distance; and
providing an alarm notice with the alarm device based on the second signal.

18. The method according to claim 17, further comprising:
displaying, on a display unit, a list which shows at least one of the first radio device and the alarm device associated with the first radio device, and an information indicating the distance to the first radio device.

19. The method according to claim 17, further comprising:
transmitting a third signal;
receiving a unique ID signal that the first radio device transmitted in response to the received third signal.

20. The method according to claim 17, further comprising:
storing, in the memory, a date and time in association with the first identification with the second identification;
calculating an elapsed time based on the stored date and time; and
determining when the calculated elapsed time is greater than a predetermined time amount, wherein
the second signal is transmitted after it is determined that the calculated elapsed time is greater than the predetermined time amount.

* * * * *